(12) United States Patent
Jauch et al.

(10) Patent No.: US 6,489,556 B1
(45) Date of Patent: Dec. 3, 2002

(54) ASSEMBLY FOR CABLE CONDUITS OF A PIECE OF WORKSTATION FURNITURE

(75) Inventors: Ala Jauch, Dinkelsbühl (DE); Markus Schmidt, Betzdorf (DE); Werner-Josef Kaiser, Elkenroth (DE)

(73) Assignee: Otto Lampertz GmbH & Co. KG, Wallmenroth (DE)

( * ) Notice: Subject to any disclaimer, the term of this patent is extended or adjusted under 35 U.S.C. 154(b) by 0 days.

(21) Appl. No.: 09/807,822

(22) PCT Filed: Oct. 14, 1999

(86) PCT No.: PCT/EP99/07710

§ 371 (c)(1),
(2), (4) Date: Apr. 19, 2001

(87) PCT Pub. No.: WO00/24102

PCT Pub. Date: Apr. 27, 2000

(30) Foreign Application Priority Data

Oct. 21, 1998 (DE) .......................... 198 48 525

(51) Int. Cl.⁷ ................................ H02G 3/04
(52) U.S. Cl. .................... 174/48; 174/60; 174/65 R; 174/68.3; 52/220.8; 439/207
(58) Field of Search ............... 174/48, 50, 58, 174/63, 65 R, 60, 97, 101, 68.1, 68.3; 220/3.6, 3.8, 4.02; 248/906; 439/535, 207; 138/162, 157; 52/220.3, 220.8

(56) References Cited

U.S. PATENT DOCUMENTS

| 3,927,698 A | | 12/1975 | Johannsen |
| 4,907,767 A | | 3/1990 | Corsi et al. |
| 5,792,992 A | * | 8/1998 | Handler ............... 174/48 X |
| 5,949,025 A | * | 9/1999 | Nagai et al. ............... 174/101 |
| 6,029,713 A | * | 2/2000 | Miranda ............... 138/162 |
| 6,239,364 B1 | * | 5/2001 | Nickel ............... 174/48 |
| 6,353,179 B1 | * | 3/2002 | Davidson ............... 174/48 |

FOREIGN PATENT DOCUMENTS

| DE | 90 03 119 | 5/1990 |
| DE | 91 15 442.1 | 4/1992 |
| DE | 196 10 347 | 4/1997 |
| FR | 2 613 145 | 9/1988 |

* cited by examiner

Primary Examiner—Chau N. Nguyen
Assistant Examiner—Dhiru R Patel
(74) Attorney, Agent, or Firm—Pauley Petersen Kinne & Erickson

(57) ABSTRACT

An assembly for cable conduits of a piece of workstation furniture having a plurality of different profile sections which can be inserted into one another, which have essentially planar outer sides, and which support connecting elements or connecting grooves, the elements or grooves being formed on the inner sides. The assembly has four different profile sections including a curved wall profile section, a side wall profile section, a wall termination profile section, and a cover profile section which can be inserted into one another to form different cable conduit structures using simple insertion elements.

14 Claims, 2 Drawing Sheets

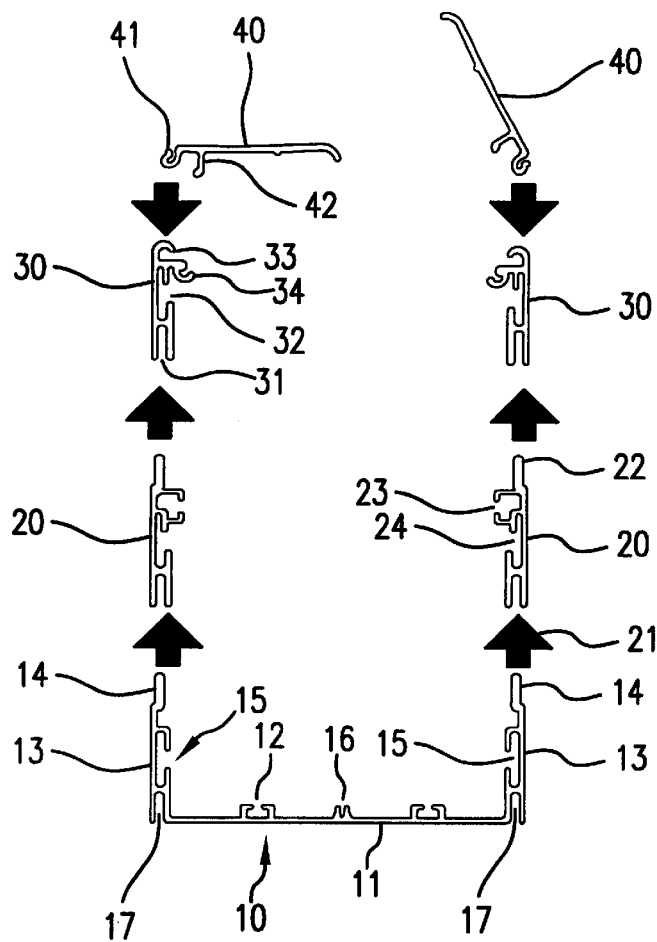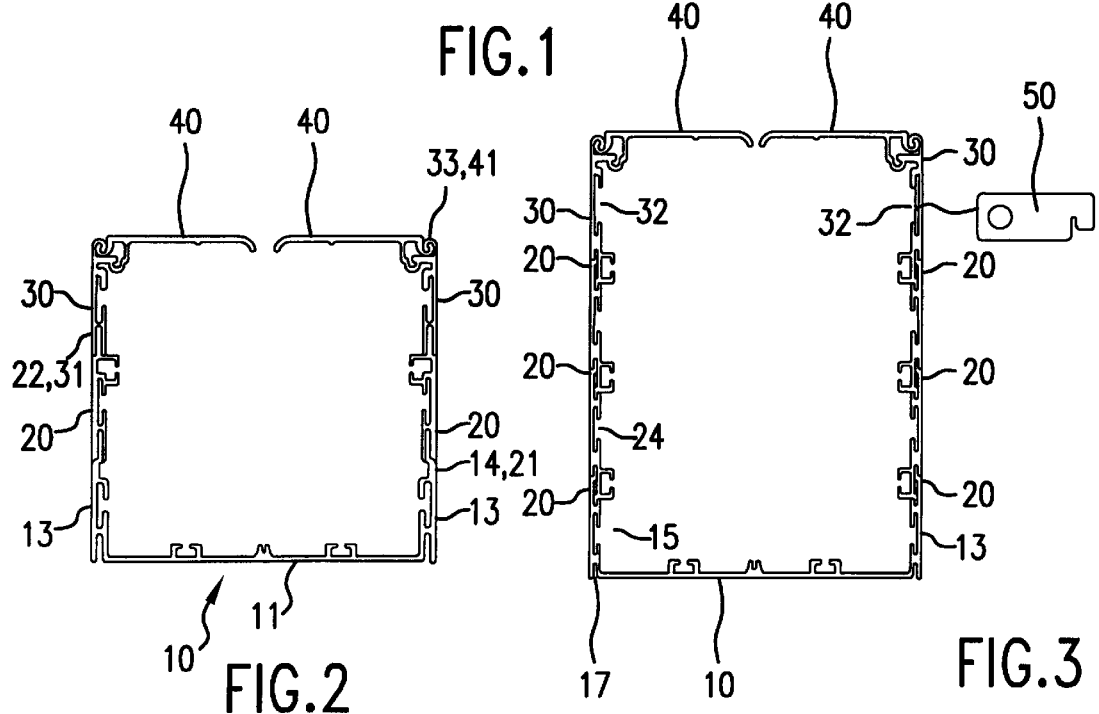
FIG.1
FIG.2
FIG.3

ASSEMBLY FOR CABLE CONDUITS OF A PIECE OF WORKSTATION FURNITURE

BACKGROUND OF THE INVENTION

1. Field of the Invention

This invention relates to a kit for cable conduits for a piece of workstation furniture having several different profiled sections, which can be plugged together, having essentially flat exteriors and support connecting strips or connecting grooves on the interior.

2. Description of Related Art

A kit of this type is known from German Patent Reference DE 196 10 347 C1. The connecting strips and connecting grooves formed on the interiors are used for fastening cables or built-in elements in the assembled cable conduit. Complex connecting and counter-connecting elements have been formed out of the free longitudinal edges of the profiled sections for connecting the profiled sections with each other. Also, it is only possible to plug together cable conduits of small receiving spaces with the different profiled sections.

SUMMARY OF THE INVENTION

It is one object of this invention to provide a kit of the type mentioned above but with cable conduits of different sizes in closed or partial embodiment, wherein only simple connecting elements need to be provided at the profiled sections for connecting the profiled sections.

In accordance with this invention, this object is achieved with a kit having four different profiled sections:
  a) tub-shaped profiled sections of U-shaped cross section, wherein the lateral legs end in plug-in strips or plug-in grooves and form plug-in grooves or plug-in strips at the transition areas to the base leg, whose plugging directions are oriented in the plane of the lateral legs;
  b) essentially flat partial profiled lateral wall sections having a plug-in groove on the one longitudinal edge and a plug-in strip on the other, and plugging directions oriented in the plane of the partial profiled lateral wall sections;
  c) essentially flat profiled wall end sections with a plug-in groove or a plug-in strip on the one longitudinal edge and a hinge receiver on the other, wherein the plugging direction of the plug-in groove or the plug-in strip is oriented in the plane of the profiled wall end section; and
  d) essentially flat profiled cover sections with a hinge strip on one longitudinal edge.

The connecting elements designed as plug-in strips and plug-in grooves are simple and provide, with an appropriately selected fitted and/or pressed seating, a sufficient support of the connection of the plugged together cable conduit. The base element in the form of a tub-shaped profiled section fixes the one dimension of the cable conduit, while the other dimension can be increased in steps by means of the partial profiled lateral wall sections. Also, louver-like covering walls can be created by means of the partial profiled lateral wall sections.

For obtaining defined plug-in connections, one embodiment matches the plug-in depth of the plug-in strips of the profiled sections to the depth of the plug-in grooves of the profiled sections, and in the plugged together cable conduit, they are symmetrically arranged in the mutual plug-in planes.

If strips, which form T-shaped connecting grooves, are formed on the interior of the profiled sections, it is possible to fix cables and built-in elements in place in the cable receiving space in the same way as with known cable conduits. The connecting grooves can have different dimensions.

Other connecting elements in a strip shape can also be formed on the interiors of the profiled sections. In one embodiment at least a portion of the connecting grooves of all profiled sections has the same dimensions and receives connecting elements plugged-in at the front. This is advantageous in connection with a horizontally oriented cable conduit, because then the cable conduit can be suspended on vertical columns of the furniture frame.

As a rule, the profiled wall end sections adjoin the lateral legs of the tub-shaped profiled section, or the last partial profiled lateral wall section which is connected with a lateral leg, in order to cover the top of the cable conduit with one or two profiled cover sections. In this case the profiled cover section can extend either over the entire width of the cable conduit, or only over half the width. For achieving a defined locking position of the profiled cover sections, the profiled wall end sections have contact strips, and in the area of the hinge strips, the profiled cover sections have contact strips, which limit and define at least one pivot position of the profiled cover section on the profiled wall end section, preferably the closed position of the cable conduit.

BRIEF DESCRIPTION OF THE DRAWINGS

This invention will be explained in greater detail in view of exemplary embodiments represented in the drawings, wherein:

FIG. 1 is a diagrammatic assembly view of a cable conduit in the assembled position of the individual profiled sections, which can be plugged together from the kit in accordance with this invention;

FIG. 2 is a view on an open front end of an assembled cable conduit of approximately square cross section;

FIG. 3 is a view of a larger cable conduit of rectangular cross section;

DESCRIPTION OF PREFERRED EMBODIMENTS

Figures 4, 5:
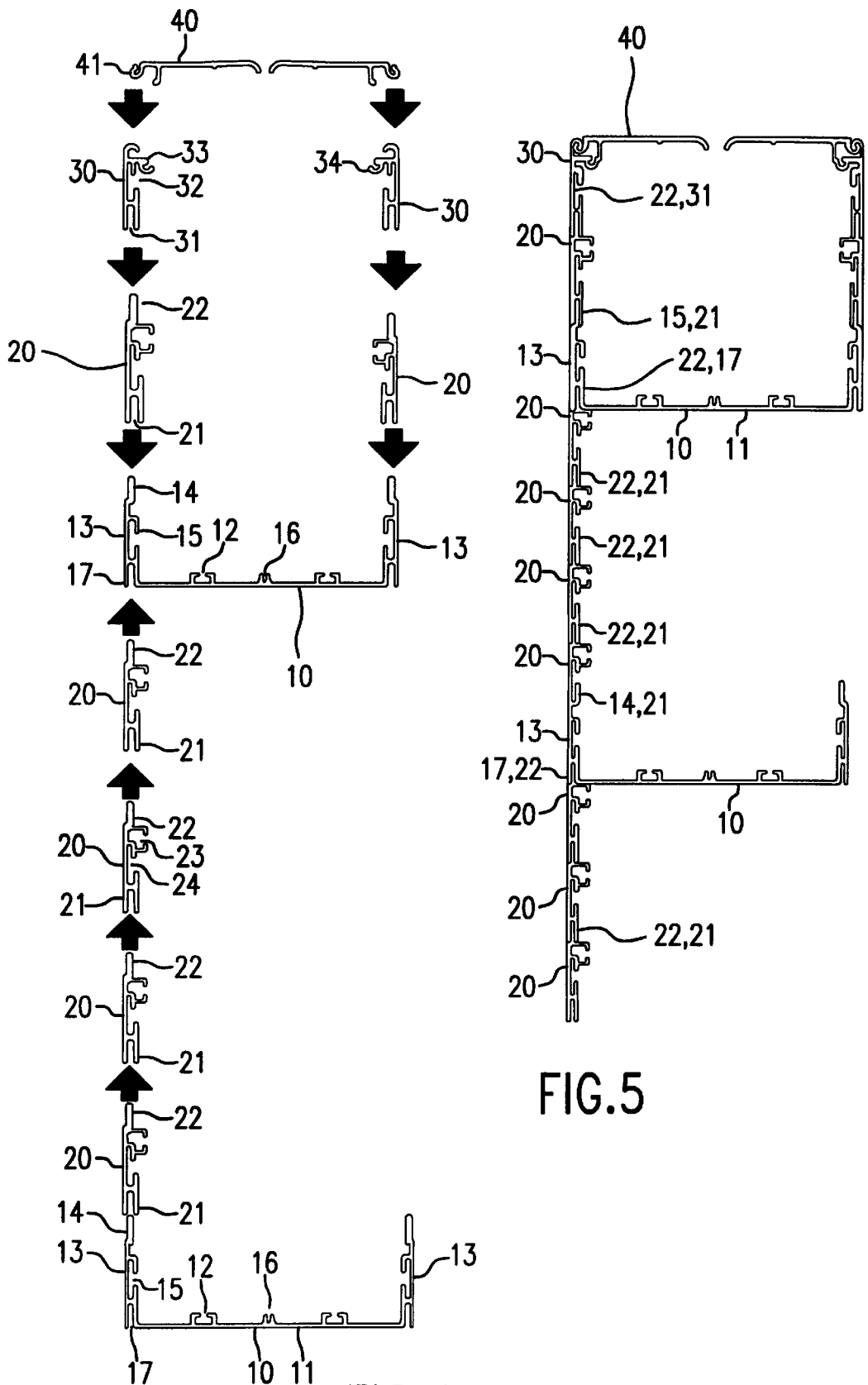
FIG. 4 is a view of an expanded cable conduit embodiment, wherein a louver-like cover wall plugged together from profiled lateral wall sections adjoins the underside of the tub-shaped profiled section, and with a lower edge is closed off with a cable receiver, open toward the top, which is formed by a further tub-shaped profiled section.
FIG. 5 is an assembled view of the assembly for cable conduits, as shown in FIG. 4.

The profiled sections for plugging together a cable conduit are shown in FIG. 1 in their assembled position, in a view on one front. A tub-shaped profiled section 10 forms the base element, which determines the width of the cable conduit to be produced and with a length cut to the required dimensions in the piece of workstation furniture, the same as all profiled sections shown. The two lateral legs 13 adjoin the base leg 11 of the tub-shaped profiled section 10 at right angles and, like the base leg 11, are essentially flat on the exterior. T-shaped connecting grooves 12 and 15 of different dimensions are formed on the interiors of the tub-shaped profiled section 10. However, it is also possible to form connecting elements 16 of different shapes for fastening built-in elements or the like. The lateral legs 13 terminate into plug-in strips 14, and the transition areas from the lateral legs 13 to the base leg 11 are embodied as plug-in grooves 17, which are oriented in one plug-in plane with the plug-in strips 14 and matched in their dimensions, so that a defined plug connection of a sufficiently satisfactory support is assured.

The lateral legs 13 of the tub-shaped profiled section 10 can be extended by partial profiled lateral wall sections 20. On one longitudinal edge the profiled lateral wall sections 20 have a plug-in groove 21, and on the other longitudinal edge have a plug-in strip 22, which are oriented and laid out the same as the plug-in groove 17 and the plug-in strip 14 of the tub-shaped profiled section 10, so that they can be connected with each other.

The lateral walls of the cable conduit are closed off by profiled wall end sections 30, which are connected by means of the plug-in groove 31 with the plug-in strip 22 of the last partial profiled lateral wall section 20. The free longitudinal edge of the profiled wall section 30 has hinge receivers 33, into which a hinge strip 41 of the profiled cover section 40 can be snapped, so that the profiled cover section 40 is pivotably connected with the profiled wall end section 30. In the exemplary embodiment, the profiled cover sections 40 extend only over half the width of the cable conduit, but they can also extend over the entire width of the cable conduit, so that the cable conduit can be closed with only one profiled cover section. In this case, the closed position can be fixed by detents 34 and 42 formed in the area of the hinge receiver 33 and the hinge strip 41, which delimit the pivot movement accordingly.

The partial profiled lateral wall sections 20 and the profiled wall sections 30 have connecting grooves 24 and 32 formed on their interiors, which are laid out identically to the connecting grooves 15 of the tub-shaped profiled section 10. Also, the profiled lateral wall sections 20 can have connecting grooves 23 which correspond to the connecting grooves 12 of the tub-shaped profiled wall section 10.

It is also possible to arrange the plug-in strips and the plug-in grooves in a reversed manner. This applies only to the tub-shaped profiled sections 10 and the profiled wall end sections 30, because the partial profiled lateral wall sections 20 have the plug-in strip 22 and the plug-in groove 21 and can only be plugged in when rotated by 180°.

FIG. 2 shows a plugged together cable conduit having a tub-shaped profiled section 10, two partial profiled lateral wall sections 20, two profiled wall end sections 30 and two profiled cover sections 40, wherein the plug connections between the profiled sections are identified by element reference numerals 14, 21 and 22, 32, and the pivot connections by element reference numerals 33, 41.

As FIG. 3 shows, the cable conduit can be enlarged in steps in the direction of the lateral legs 13 of the tub-shaped profiled section 10, wherein the number of the partial profiled lateral wall sections 20 determines the height of the cable conduit. At their front ends the connecting grooves 15, 24 and 32 can receive connecting elements 50, which are embodied as hooks and can be suspended in slits of vertical columns of the furniture frame.

The cable conduit in accordance with FIG. 2 can be enlarged to form a cable conduit in accordance with FIG. 3 by means of four further partial profiled lateral wall sections 20, wherein the lateral walls are simply extended.

As FIG. 4 shows, the cable conduit in accordance with FIG. 1 can be downwardly extended, wherein a louver-like cover wall is plugged to the tub-shaped profiled section 10 by means of four partial profiled wall sections 20, as shown by the plug-in groove 17 and the plug-in 22. This cover wall can form a rear wall, for example, and form a visual barrier toward the front of the piece of workstation furniture. A further tub-shaped profiled section 10 can be plugged to the lower profiled lateral wall section 40, as shown by the plug-in grove 21 and the plug-in strip 14, which can then be utilized as a cable tub or the like.

The cable conduit combination in accordance with FIG. 5 is similarly designed. The cable conduit, closed at the top, comprises a tub-shaped profiled section 10, two partial profiled lateral wall sections 20, two profiled wall end sections 30 and two profiled cover sections 40, and with the downwardly added four partial profiled wall sections 20 it corresponds to the combination in accordance with FIG. 4, but is represented in the plugged together state. Three further profiled lateral wall sections 20 adjoin the further tub-shaped profiled section 10 on the bottom as an extension of the rear wall.

What is claimed is:

1. In a kit for cable conduits for a piece of workstation furniture having several different profiled sections, which can be plugged together, with essentially flat exteriors and support connecting strips or connecting grooves on an interior, the improvement comprising four different profiled sections:

a tub-shaped profiled section (10) of a U-shaped cross section having lateral legs (13) each ending in one of a first plug-in strip (14) and a first plug-in groove (31), and each forming one of a second plug-in groove (17) and a second plug-in strip at each of transition areas to a base leg (11), and the tab-shaped profile section (10) having a first plugging direction oriented in a first plane of the lateral legs (13);

essentially flat partial profiled lateral wall sections (20) each having a third plug-in groove (21) on a first longitudinal edge and a third plug-in strip (22) on a second longitudinal edge, with the partial profiled lateral wall sections (20) having a second plugging direction oriented in a second plane of the partial profiled lateral wall sections (20);

essentially flat profiled wall end sections (30) with one of a fourth plug-in groove (31) and a fourth plug-in strip (22) on the first longitudinal edge and a hinge receiver (33) on the second longitudinal edge, with the profiled wall end sections (30) having a third plugging direction oriented in a third plane of the profiled wall end sections (30); and essentially flat profiled cover sections (40) with a hinge strip (41) on an edge of each of the profiled cover sections (40).

2. In the kit in accordance with claim 1, wherein a plug-in depth of each of the plug-in strips (14, 22) is matched to a groove depth of each of the plug-in grooves (17, 21, 31).

3. In the kit in accordance with claim 2, wherein an interior of each of the profiled sections forms a T-shaped connecting groove (12, 15, 24, 32).

4. In the kit in accordance with claim 3, wherein the connecting groove (12, or 15, 24, 32) of the profiled sections have different dimensions.

5. In the kit in accordance with claim 4, wherein the connecting groove (15, 24, 32) receives a connecting element (50) plugged-in at a front.

6. In the kit in accordance with claim 5, wherein a horizontally oriented cable conduit and a connecting element (50) are formed as a hook which is suspended on a vertical column of a furniture frame.

7. In the kit in accordance with claim 6, wherein near the hinge receiver (33), each of the profiled wall end sections

(30) has a first contact strip (34, 42), and near the hinge strip (41), each of the profiled cover sections (40) has a second contact strip which limit and define at least one pivot position of one of the profiled cover sections (40) on one of the profiled wall end sections (30).

8. In the kit in accordance with claim 7, wherein closed and partially open cable conduits of different cross sections, and louver covering walls are assembled from the tub-shaped profiled section (10), the partial profiled lateral wall sections (20), the profiled wall end sections (30) and the profiled cover sections (40).

9. In the kit in accordance with claim 1, wherein an interior of each of the profiled sections forms a T-shaped connecting groove (12, 15, 24, 32).

10. In the kit in accordance with claim 9, wherein connecting grooves (12, or 15, 24, 32) of the profiled sections have different dimensions.

11. In the kit in accordance with claim 3, wherein connecting grooves (15, 24, 32) of the profiled sections each receives a connecting element (50) plugged-in at a front.

12. In the kit in accordance with claim 11, wherein a horizontally oriented cable conduit and a connecting element (50) are formed as a hook which is suspended on a vertical column of a furniture frame.

13. In the kit in accordance with claim 1, wherein near the hinge receiver (33), each of the profiled wall end sections (30) has a first contact strip (34, 42), and near the hinge strip (41), each of the profiled cover sections (40) has a second contact strip which limit and define at least one pivot position of one of the profiled cover sections (40) on one of the profiled wall end sections (30).

14. In the kit in accordance with claim 1, wherein closed and partially open cable conduits of different cross sections, and louver covering walls are assembled from the tub-shaped profiled section (10), the partial profiled lateral wall sections (20), the profiled wall end sections (30) and the profiled cover sections (40).

* * * * *